United States Patent [19]

Yamato et al.

[11] Patent Number: 4,583,176
[45] Date of Patent: Apr. 15, 1986

[54] METHOD FOR DETECTING ABNORMALITY IN THE FUNCTIONING OF AN ELECTRONIC CONTROL SYSTEM

[75] Inventors: Akihiro Yamato; Yutaka Otobe, both of Shiki, Japan

[73] Assignee: Honda Giken Kogyo K.K., Tokyo, Japan

[21] Appl. No.: 530,198

[22] Filed: Sep. 8, 1983

[30] Foreign Application Priority Data

Sep. 18, 1982 [JP] Japan .................................. 57-162643

[51] Int. Cl.$^4$ .............................................. F02D 33/00
[52] U.S. Cl. .................. 364/431.11; 123/479; 123/589
[58] Field of Search ........... 364/431.11, 431.1, 431.06, 364/551; 123/479, 489, 589

[56] References Cited

U.S. PATENT DOCUMENTS

| 4,380,985 | 4/1983 | Otsuka et al. | 123/589 |
| 4,450,812 | 5/1984 | Otsuka et al. | 123/589 |

FOREIGN PATENT DOCUMENTS

| 0013838 | 2/1979 | Japan | 123/479 |
| 0005433 | 1/1980 | Japan | 123/479 |
| 0062944 | 4/1982 | Japan | 123/479 |
| 2090978 | 7/1982 | United Kingdom | 123/479 |

*Primary Examiner*—Parshotam S. Lall
*Attorney, Agent, or Firm*—Arthur L. Lessler

[57] ABSTRACT

A method for detecting an abnormality in the functioning of an electronic control system of the type including at least one input means, and at least one output means, wherein the input means is operable to detect the value of a parameter determining the operation of the output means and generate a signal indicative of the detected parameter value, on the basis of which the operation of the output means is controlled. First, a determination is made as to whether or not a predetermined condition exists wherein determination of the above abnormality can be effected. When the predetermined abnormality detection-permitting condition exists, it is determined whether or not the above detected parameter signal value from the input means or an operating amount signal indicative of the operation of the output means has a value satisfying a predetermined condition of normal operation. When the detected parameter signal value is determined not to show a value satisfying the above predetermined condition of normal operation, the time elapsing from the determination of dissatisfaction of the same condition is counted. When satisfaction of the predetermined condition of normal operation is determined before the counted elapsed time value reaches a predetermined value, the counting is interrupted. When the counted elapsing time value reaches the predetermined value, it is diagnosed that an abnormality exists in the functioning of the above corresponding input means or output means. When a predetermined abnormality detection-prohibiting condition exists after the counting of the elapsed time has been started and before the counted elapsed time value reaches the above predetermined value, the counting is also interrupted. The present abnormality detecting method can advantageously be applied to an electronic control system for internal combustion engines.

7 Claims, 5 Drawing Figures

METHOD FOR DETECTING ABNORMALITY IN THE FUNCTIONING OF AN ELECTRONIC CONTROL SYSTEM

BACKGROUND OF THE INVENTION

This invention relates to a method for detecting an abnormality in the functioning of an electronic control system, and more particularly to a method of this kind which can perform such abnormality determination in an accurate manner without making a wrong diagnosis.

An abnormality detecting method has conventionally been employed, which comprises detecting abnormalities in the functioning of input means and output means of an electronic control system, particularly one for controlling the operation of an internal combustion engine, such as an electronic fuel supply control system, an ignition timing control system, an exhaust gas recirculation control system, an idling speed control system, and an air-fuel ratio feedback control system, and upon detection of such an abnormality, performing a warning action and/or a fail-safe action, thereby preventing malfunction of the engine even in the event of a failure in such input means or output means.

The above input means typically include various sensors for detecting values of various operating parameters of an internal combustion engine, such as engine rotational speed, throttle valve opening and exhaust gas concentration, and values of parameters indicative of atmospheric conditions such as atmospheric pressure and ambient temperature, analog-to-digital converters for converting the detected parameter values into corresponding digital signals, and level shifters for changing the voltage levels of signals indicative of such parameter values into a suitable predetermined level. On the other hand, the above output means include fuel injection valves arranged respectively at cylinders of the engine, an exhaust gas recirculating valve, and a fuel pump.

According to such abnormality detecting method, detection of abnormalities in the operations of such input means and output means is made in the following manners, as disclosed in Japanese Provisional Patent Publication (Kokai) No. 54-141926: To detect abnormalities in the functioning of the input means, it is determined whether or not the values of such parameter signals generated by the input means lie within respective ranges of values which can be obtained while the engine is normally operating. On the other hand, to detect abnormalities in the functioning of the output means, the amount of operation of the output means, for instance the valve lifting amount of any of the aforementioned valves, is detected, and it is then determined whether or not a signal indicative of the detected operating amount shows a value lying in a predetermined relationship with respect to the value of a command signal commanding the output means to achieve a required amount of operation, for instance, whether or not the difference between the value of the detected operating amount signal and the value of the command signal is larger than a predetermined value.

In the course of execution of such detection of abnormalities in the values of output parameter signals from such input means and in the values of actual operating amount signals from such output means, there can occur a phenomenon that the value of such a signal is wrongly determined to be abnormal due to an external disturbance such as noise, even when no abnormality actually exists in the input means or output means, resulting in unexpected execution of the aforementioned warning action and/or fail-safe action. To avoid such inconvenience, an abnormality detecting method has also been proposed e.g. by Japanese Provisional Patent Publication (Kokai) No. 54-14634 corresponding to U.S. Pat. No. 4,246,566, which comprises detecting the occurrence of an abnormality in the value of each of the aforementioned parameter and operating amount signals available with input means and output means at predetermined intervals of time for instance, upon generation of each pulse of a signal indicative of top-dead-center positions (TDC) of the engine, resetting a corresponding one of abnormality determining timers provided for respective ones of the input means and output means each time no abnormality is detected in the signal value, while actuating the corresponding timer when an abnormality is detected in the signal value, and determining that the input means or output means is abnormal in functioning, after a predetermined period of time has elapsed from the last actuation of the corresponding timer. The above predetermined period of time is set at a suitable value dependent on the probable frequency of generation of noise in the parameter signal or the actual operating amount signal, or the required timing of execution of such warning action and/or failsafe action in the event of occurrence of an abnormality in the functioning of an input means or an output means to be diagnosed.

However, when an internal combustion engine is operating in a predetermined operating region, for instance, when the engine is in a starting condition wherein the starter of the engine is operating and simultaneously the engine rotational speed is lower than a predetermined value lower than the idling speed of the engine, for instance 400 rpm, most of the input means and output means are not yet in stably operable states. On such occasion, some of the output parameter signals or the actual operating parameter signals from the input means and output means can continuously show abnormal values over the respective predetermined periods of time of corresponding ones of the aforementioned timers. Further, at the start of the engine and when the engine is in an operating region immediately before stopping, wherein the engine rotational speed is lower than 20 rpm for instance, the time interval of generation of pulses of the aforementioned TDC signal can be larger than a predetermined counting period of time set for an abnormality determining timer as aforementioned. If on such occasion the timer is actuated due to noise or a like factor, the timer operates over its predetermined period of time before a resetting signal is applied to the timer to reset same. Consequently, it is wrongly diagnosed that the associated input means or output means is abnormal in functioning, resulting in unexpected execution of the warning action and/or fail-safe action.

Moreover, in a fuel injection control system for an internal combustion engine as disclosed in Japanese Provisional Patent Publication (Kokai) No. 54-141926, hereinbefore referred to, which is adapted to detect abnormalities in the functioning of the input means and output means, in synchronism with generation of pulses of an interrupt signal, if the abnormality detection is made in synchronism with generation of the TDC signal, when the engine is operating in a certain high rotational speed region wherein the time interval between adjacent pulses of the TDC signal is very small, only calculation of the fuel injection quantity, which is indispensable for control of the operation of the engine, is executed, while the abnormality detection of the input means and output means is suspended. If on such occasion an abnormality determining timer as aforementioned is actuated immediately before the suspension of the abnormality detection, the timer can continuously operate over its predetermined counting period of time, resulting in execution of the warning action and/or fail-safe action, because no resetting signal is applied to the timer after the suspension of the abnormality detection.

SUMMARY OF THE INVENTION

It is the object of the invention to provide a method for detecting an abnormality in the functioning of an electronic control system, which is capable of detecting such abnormality in a highly accurate manner without making a wrong diagnosis, thereby being high in reliability.

According to the invention, there is provided a method for detecting an abnormality in the functioning of an electronic control system of the type including at least one input means, and at least one output means, wherein the input means is operable to detect the value of a parameter determining the amount of operation of the output means and generate a signal indicative of the detected parameter value, on the basis of which the operation of the output means is controlled. The method according to the invention comprises the following steps: (1) determining which of a first predetermined condition in which determination of the abnormality is to be effected and a second predetermined condition in which it is not to be effected exists; (2) when it is determined that the first predetermined condition exists, determining whether or not at least one of the above signal indicative of the detected parameter value from the input means and a signal indicative of the amount of operation of the output means has a value satisfying a predetermined condition of normal operation of a corresponding one of the input means and the output means; (3) when it is determined that the above signal does not have a value satisfying the above predetermined condition of normal operation, counting the time elapsing from the above determination of dissatifaction of the predetermined condition of normal operation; (4) interrupting the counting, when it is determined that the detected parameter signal shows a value satisfying the predetermined condition of normal operation before the counted elapsed time value reaches a predetermined value; (5) determining that an abnormality exists in the functioning of the above corresponding one of said input means and the output means, when the counted elapsed time value reaches the predetermined period value; and (6) interrupting the counting, when it is determined that the above second predetermined condition stands after the counting of the elapsed time has been started and before the counted elapsed time value reaches the predetermined value.

Preferably, the counting of the elapsed time is started from zero, when it is again started after it has been interrupted. The above predetermined value of the counted elapsed time is set at a value particular to the above corresponding one of the at least one input means and the at least one output means.

The method according to the invention can advantageously be applied to determination of an abnormality in the functioning of an electronic control system for an internal combustion engine, wherein it is determined whether or not at least one of a signal indicative of a detected parameter value from at least one input means for detecting the value of a parameter for control of the operation of the engine and a signal indicative of the amount of operation of at least one output means for controlling the operation of the engine has a value satisfying a predetermined condition of normal operation of a corresponding one of the input means and the output means.

The fulfillment of the aforementioned second predetermined condition in which the determination of the abnormality is not to be effected is determined depending upon whether or not the engine is operating in one of a number of predetermined operating regions which include: (a) an engine starting region where the starter of the engine is operating and the engine rotational speed is lower than a first predetermined value lower than the idling speed of the engine; (b) a high engine rotational speed region where the engine rotational speed is higher than a second predetermined value higher than the idling speed; and (c) a low engine rotational speed region where the engine rotational speed is lower than a third predetermined value lower than the idling speed.

The above and other objects, features and advantages of the invention will be more apparent from the ensuing detailed description taken in conjunction with the accompanying drawings.

DETAILED DESCRIPTION

The method of the invention will now be described in detail with reference to the drawings.

Figure 1:
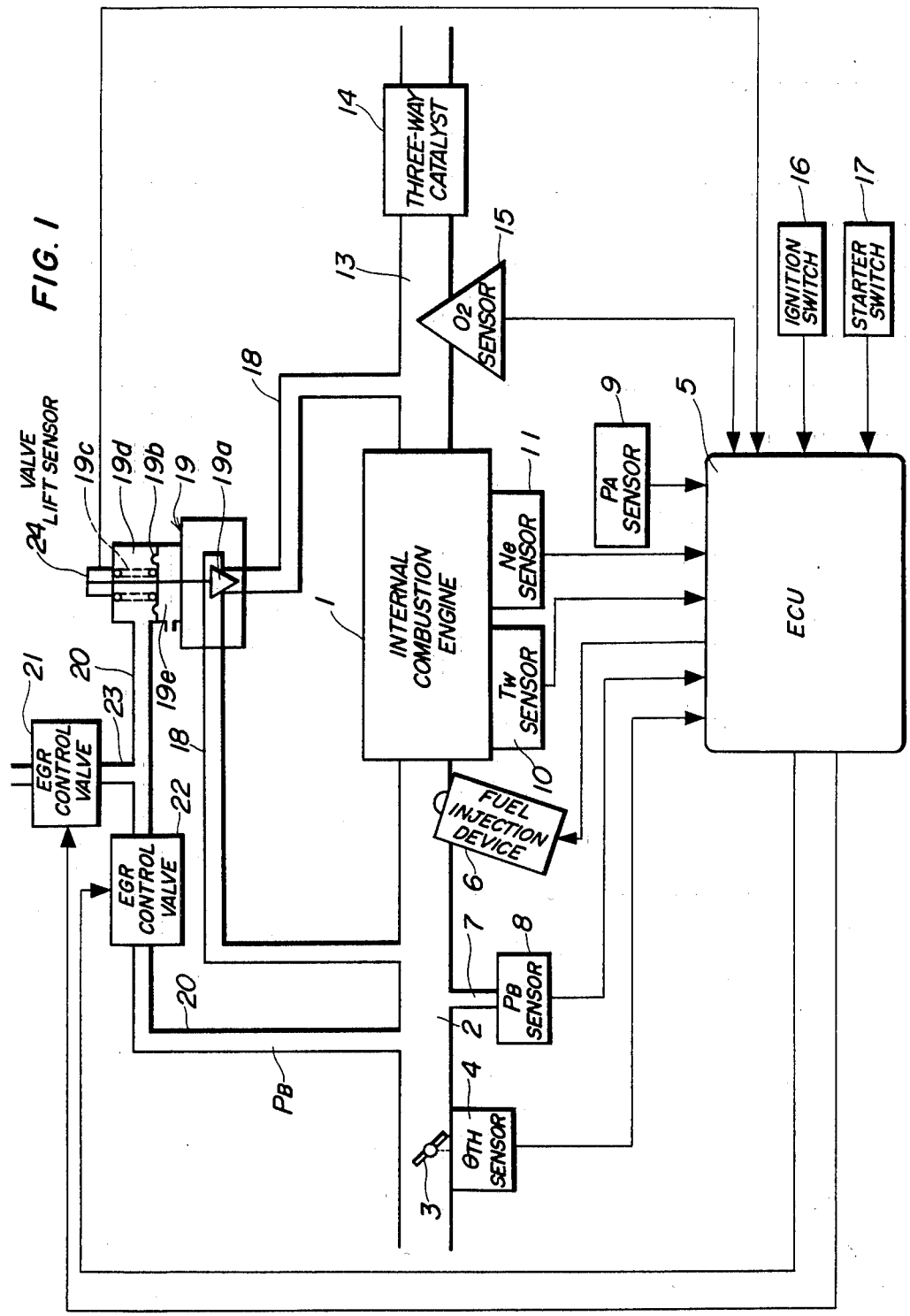
FIG. 1 is a block diagram of the whole arrangement of an exhaust gas recirculation control system and a fuel supply control system to which the method according to the invention is applicable.

Referring first to FIG. 1, there is illustrated the whole arrangement of an exhaust gas recirculation control system and a fuel supply control system for internal combustion engines, to which the method according to the invention is applicable. Reference numeral 1 designates an internal combustion engine which may be a four-cylinder type, for instance. An intake pipe 2 is connected to the engine 1, in which is arranged a throttle valve 3, which in turn is coupled to a throttle valve opening sensor 4 for detecting its valve opening and converting same into an electrical signal which is supplied to an electronic control unit (hereinafter called "the ECU") 5.

Fuel injection valves 6 are arranged in the intake pipe 2 at a location between the engine 1 and the throttle valve 3, which correspond in number to the engine cylinders and are each arranged at a location slightly upstream of an intake valve, not shown, of a corresponding engine cylinder. These fuel injection valves 6 are connected to a fuel pump, not shown, and also electrically connected to the ECU 5 in a manner having their valve opening periods or fuel injection quantities controlled by signals supplied from the ECU 5.

On the other hand, a negative pressure sensor (PB sensor) 8 communicates through a conduit 7 with the interior of the intake pipe at a location immediately downstream of the throttle valve 3. The negative pressure (PB) sensor 8 is adapted to detect negative pressure in the intake pipe 2 and applies an electrical signal PB indicative of detected intake pipe pressure to the ECU 5.

An engine cooling water temperature (TW) sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rotational speed (Ne) sensor (hereinafter called "the Ne sensor") 11 is arranged in facing relation to a camshaft, not shown, of the engine 1 or a crankshaft of same, not shown. The Ne sensor 11 is adapted to generate one pulse at a particular crank angle of the engine each time the engine crankshaft rotates through 180 degrees, i.e., upon generation of each pulse of a top-dead-center position (TDC) signal. The above pulses generated by the Ne sensor 11 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are an atmospheric pressure (PA) sensor 9 for detecting atmospheric pressure, an ignition switch 16 for turning on and off the ignition device, not shown, of the engine 1 and a starter switch 17 for actuating the engine starter, not shown, of the engine 1, respectively, for supplying an electrical signal indicative of detected atmospheric pressure, an electrical signal indicative of on and off positions of the ignition device, and an electrical signal indicative of on and off positions of the starter to the ECU 5.

An exhaust gas recirculating passageway 18 is provided which connects the exhaust pipe 13 to the intake pipe 2, and across which is mounted an exhaust gas recirculating valve 19. This valve 19 is a negative pressure-actuated type and comprises a valve body 19a arranged for opening and closing the passageway 18, a diaphragm 19b coupled to the valve body 19a and actuatable by atmospheric pressure or negative pressure which is selectively applied thereto by means of EGR control valves 21 and 22 which are both formed by solenoid-controlled valves, and a spring 19c urging the diaphragm 19b in the valve closing direction. A negative pressure chamber 19d is defined by the diaphragm 19b, which communicates with a communication passageway 20 for introducing negative pressure in the intake pipe 2 by way of the EGR control valve 22 which is a normally closed type and arranged across the communication passageway 20. An atmospheric pressure chamber 19e is defined by the diaphragm 19, which communicates directly with the atmosphere. An atmospheric pressure-intake passageway 23 is joined to the communication passageway 20 at a location downstream of the EGR control valve 22 so that atmospheric pressure can be introduced into the communication passageway 20 by way of the EGR control valve 21 which is a normally open type and which is arranged across the communication passageway 22, and then guided into the negative pressure chamber 19d. The EGR control valves 21, 22 are both electrically connected to the ECU 5 for operation in unison with each other or alone in response to control signals from the ECU 5 to control the lifting motion of the valve body 19a of the exhaust gas recirculation valve 19 and the moving speed thereof.

A valve lift sensor 24, which may be formed of a potentiometer, is mounted on the exhaust gas recirculating valve 19 for detecting the operating position of the valve body 19a of the valve 19 and supplying an electrical signal indicative of a detected operating position of the valve body to the ECU 5.

The ECU 5 is operable in synchronism with generation of pulses of the TDC signal and in response to the above-mentioned various engine operating parameter signals to determine whether or not the engine is operating in an operating region wherein determination of abnormalities in the signals inputted to and outputted from the ECU 5 can be executed, and to execute determination of such abnormalities when a condition allowing execution of such determination stands. While executing such abnormality determination so long as the above condition stands, the ECU 5 calculates in response to operating conditions of the engine the fuel injection period TOUT for the fuel injection valves 6 as well as a valve opening command value LCMD for the exhaust gas recirculating valve 19.

The fuel injection period TOUT is calculated by the following equation (1):

$$TOUT = Ti \times K1 + K2 \qquad (1)$$

where Ti represents a basic value of the fuel injection period which is calculated on the basis of intake pipe negative pressure PB and engine rotational speed Ne, K1 and K2 represent correction coefficients, the values of which are calculated by means of respective predetermined equations and in response to the values of signals from the aforementioned various sensors, such as the throttle valve opening sensor 4, the intake pipe negative pressure sensor 8, the atmopsheric pressure sensor 9, the engine cooling water temperature sensor 10, the Ne sensor 11, the $O_2$ sensor 15, the ignition switch 16, and the starter switch 17, so as to achieve optimal operating characteristics of the engine such as startability, emission characteristics, fuel consumption and accelerability.

The ECU 5 operates on the above calculated value of the fuel injection period to supply driving signals to the fuel injection valves 6 to open same.

A desired valve opening command value LCMD for the exhaust gas recirculating valve 19 as aforementioned is selectively read from a group of such desired valve opening command values which are previously stored, which corresponds to actual values of the engine rotational speed Ne and the intake pipe negative pressure PB.

The ECU 5 compares the read desired valve opening command value LCMD and the actual valve opening value LACT detected by the valve lift sensor 24, and supplies driving signals to the EGR control valves 21, 22 to actuate them in unison with each other or alone so as to minimize the difference between the two values.

When the EGR control valves 21, 22 are both energized, the communication passageway 20 is opened and at the same time the atmospheric pressure-intake passageway 23 is closed so that the negative pressure PB in the intake pipe 2 at a zone downstream of the throttle valve 3 is introduced into the negative pressure chamber 19d of the exhaust gas recirculating valve 19. Thus, the difference between the pressures acting upon the opposite side surfaces of the diaphragm 19b increases to cause upward displacement of the diaphragm 19b as view in FIG. 1, against the force of the spring 19c, resulting in an increase in the valve opening of the valve 19. On the contrary, when the EGR control valves 21, 22 are both deenergized, the negative pressure chamber 19d is supplied with atmospheric air to cause displacement of the valve body 19a in the valve closing direction. In this way, the valve lifting amount of the exhaust gas recirculating valve 19 is controlled to obtain a required recirculating amount of exhaust gases to the intake pipe 2.

Figure 2:
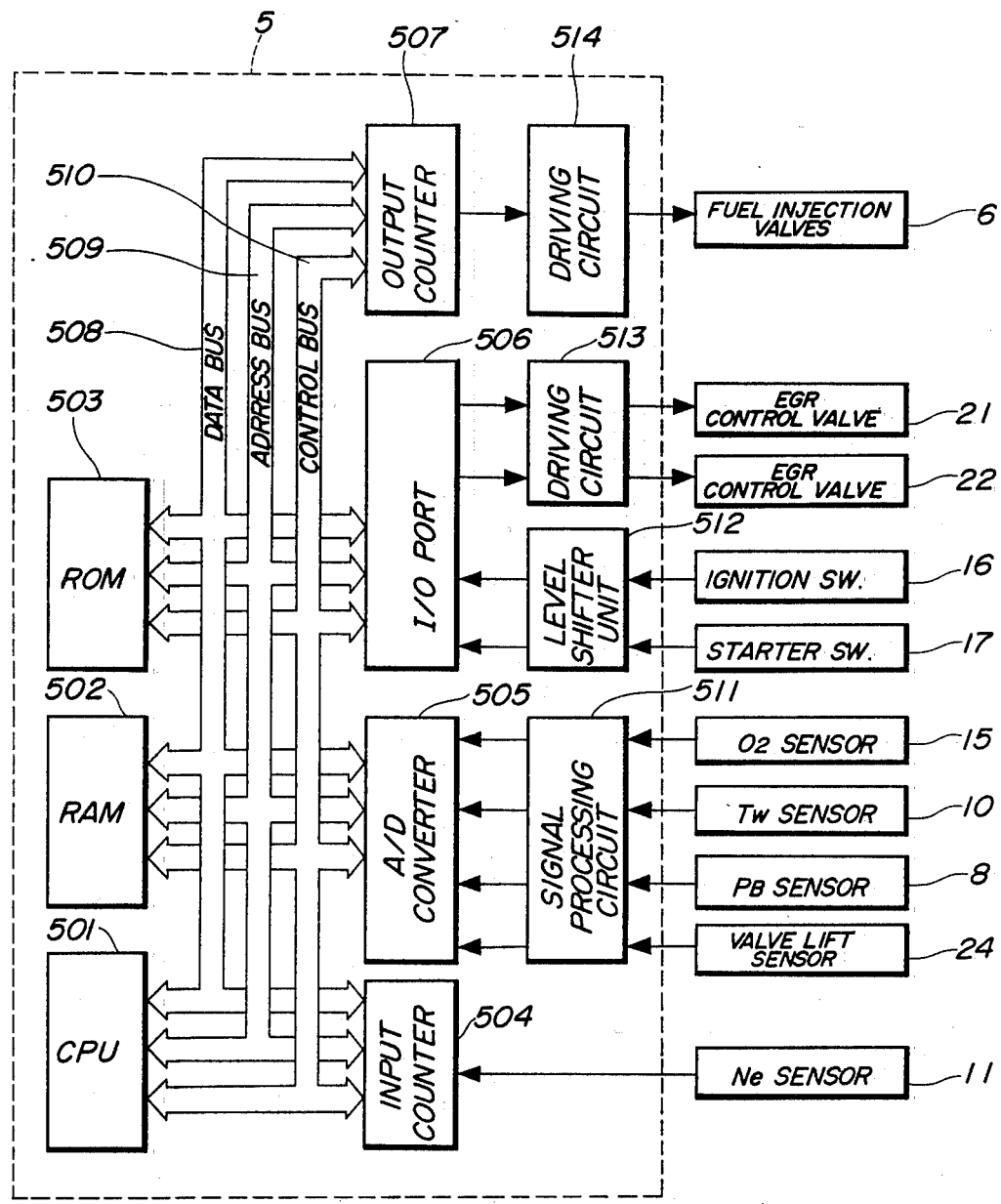
FIG. 2 is a circuit diagram of the interior construction of an electronic control unit (ECU) appearing in FIG. 1.

FIG. 2 shows in the form of a block diagram the interior construction of the ECU 5 in FIG. 1. A central processing unit (hereinafter called "the CPU") 501 is connected, by way of a data bus 508, an address bus 509 and a control bus 510, to a random access memory (hereinafter called "the RAM") 502 for temporarily storing results of calculations within the CPU 501, etc., a read-only memory (hereinafter called "the ROM") 503 storing a control program to be executed within the CPU 501, a map of basic values Ti of the fuel injection period, a map of desired valve opening command values LCMD for the exhaust gas recirculating valve 19, etc., an input counter 504, an A/D converter 505, an I/0 port 506 and an output counter 507, for giving and receiving of input data and output data between the CPU 501 and the RAM 502, etc. through the above buses.

The TDC signal from the Ne sensor 11 in FIG. 1 is supplied to the above input counter 504 which is actuated by each pulse of the TDC signal to generate and apply a single pulse to the CPU 501 through the data bus 508 as a TDC-synchronizing signal, and at the same time the input counter 504 counts the time interval Me between adjacent pulses of the TDC signal. The counted value Me, which is proportional to the reciprocal of the engine rpm Ne, is supplied to the CPU 501 through the data bus 508.

Parameter signals from the various sensors such as the intake pipe negative pressure (PB) sensor 8, the engine water temperature sensor (TW) sensor 10, the O2 sensor 15, the valve lift sensor 24, etc. as appearing in FIG. 1, are shifted into a predetermined voltage level by means of a signal processing circuit 511, and then successively applied to the A/D converter 505 to be converted into respective corresponding digital signals. These digital signals are successively supplied to the CPU 501.

On-off position signals from the ignition switch 16 and the starter switch 17 are successively shifted into a predetermined voltage level by means of a level shifter 512, and then are successively supplied to the CPU 501 through the I/O port 506.

The CPU 501 calculates the fuel injection period TOUT for the fuel injection valves 6 in response to the values of the aforementioned various engine operating parameter signals in accordance with the control program stored in the ROM 503, and supplies the resultant calculated value to the output counter 507 through the data bus 508. The output counter 507 in turn generates a control signal to a driving circuit 514 for a period of time corresponding to the calculated value TOUT, and the driving circuit 514 supplies driving signals to the fuel injection valves 6 to energize them as long as it is supplied with the above control signal.

The CPU 501 is further operable to calculate a desired valve opening command value LCMD for the exhaust gas recirculating valve 19, compare the difference between the calculated desired valve opening value LCMD and the actual valve opening LACT, and supply one or two control signals in response to the determined difference to a driving cicuit 513 through the I/O port 506, for controlling the EGR control valve 21 and/or the EGR control valve 22. The driving circuit 513 is responsive to each of the control signals to supply a driving signal to a corresponding one of the EGR control valves 21, 22 as long as it is supplied with the same control signal.

Figure 3:
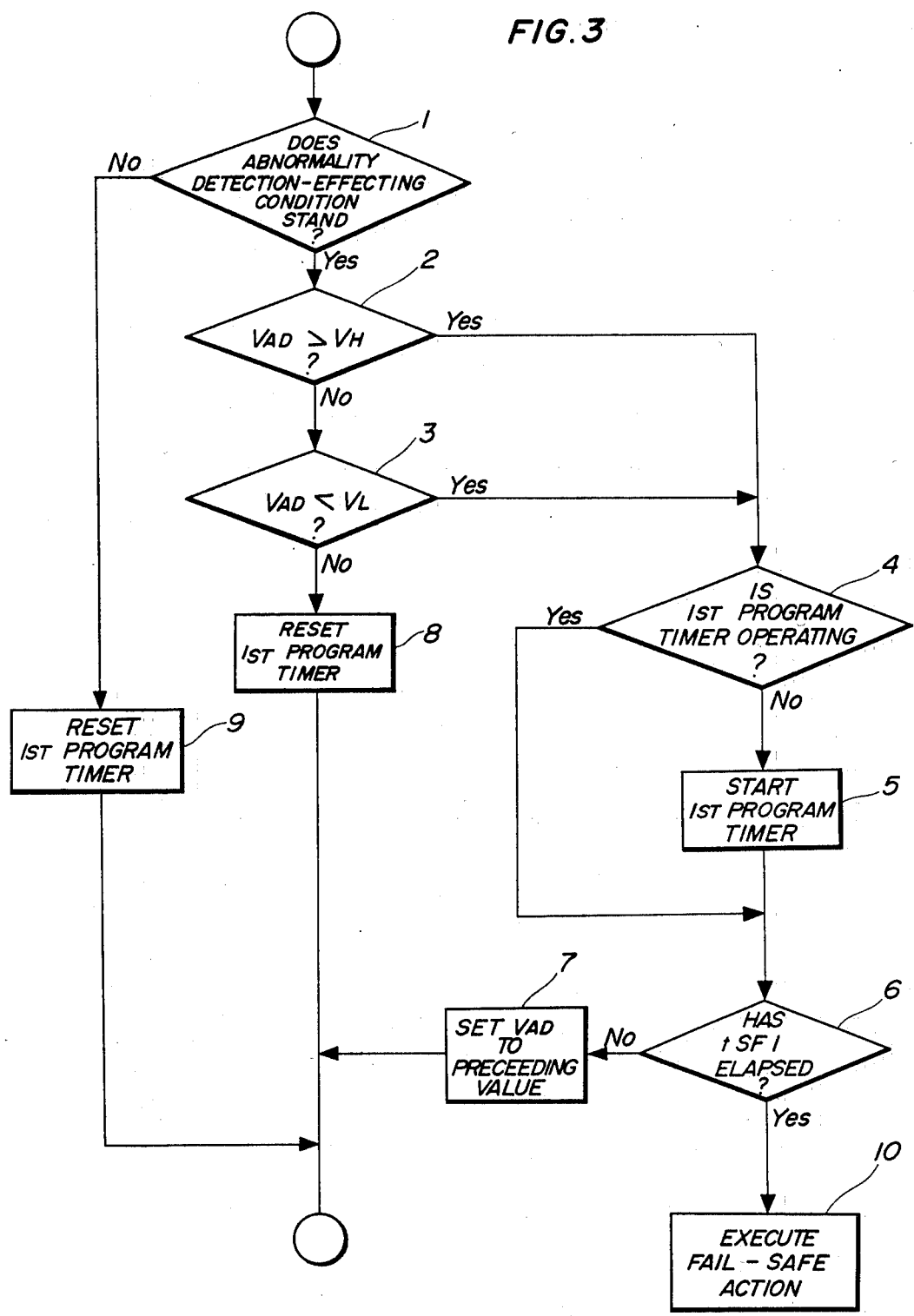
FIG. 3 is a flow chart showing a first embodiment of the method according to the invention, applied to detection of an abnormality in the functioning of an input means, which is executed within the ECU.
Figure 4:
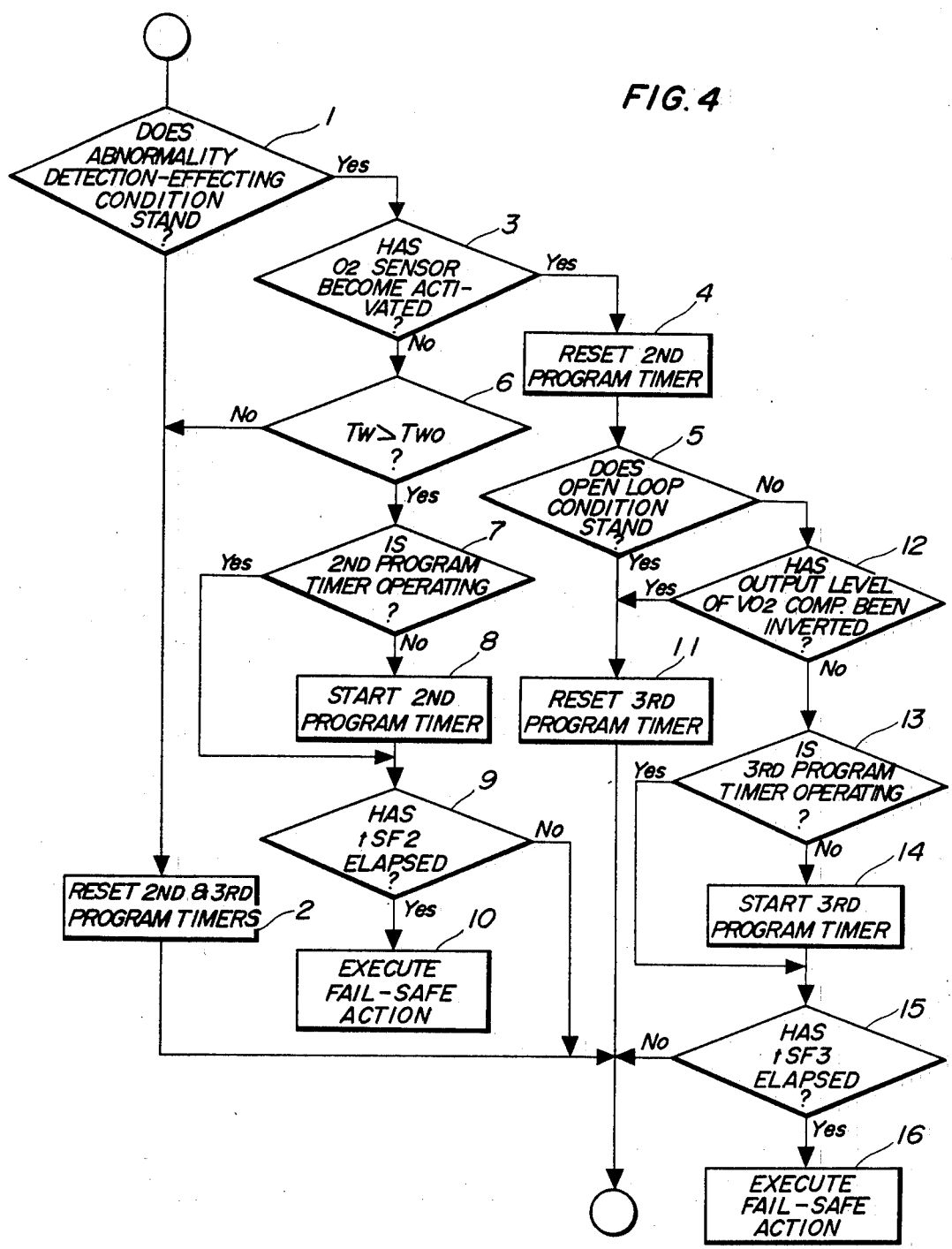
FIG. 4 is a flow chart showing a second embodiment of the method according to the invention, applied to detection of an abnormality in the functioning of an input means, which is executed within the ECU.
Figure 5:
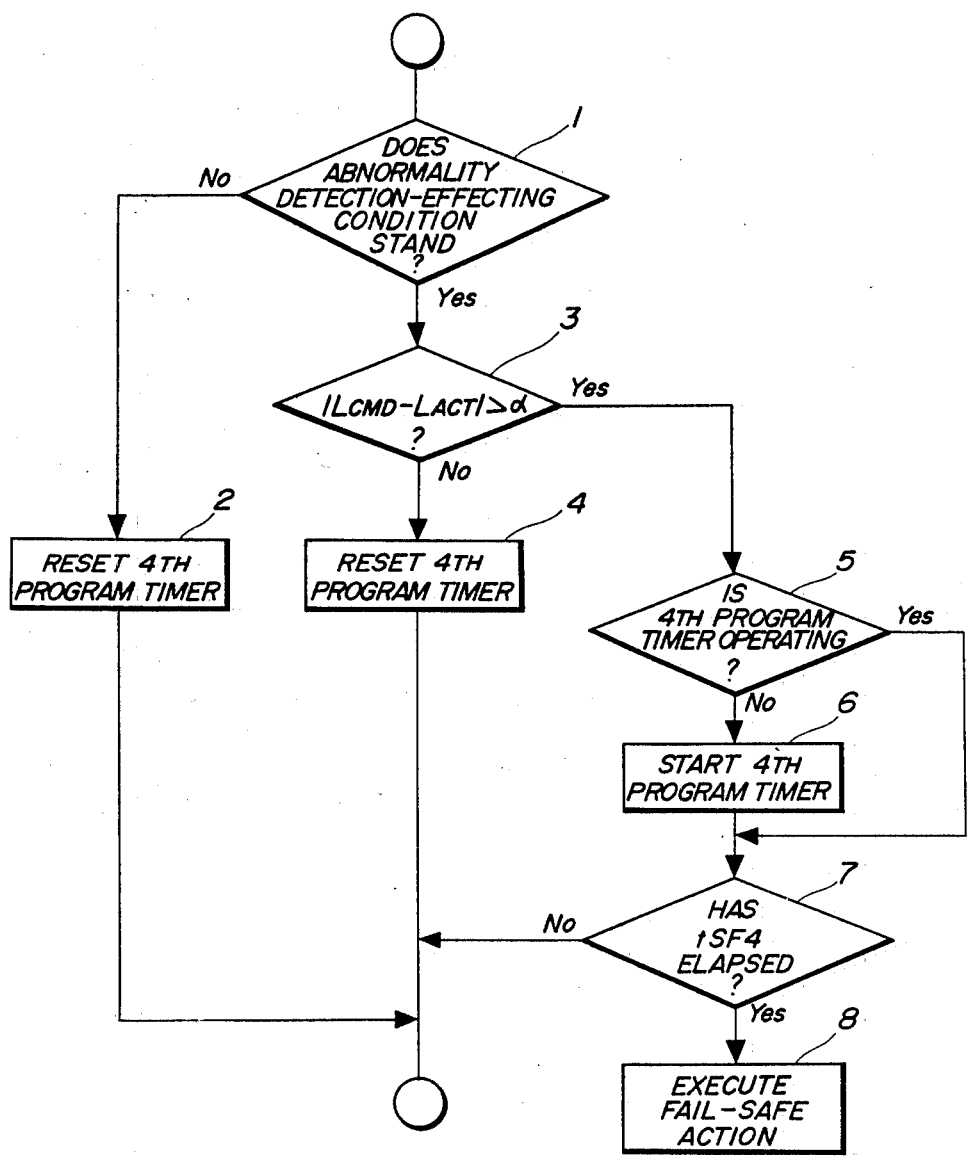
FIG. 5 is a flow chart showing a third embodiment of the method according to the invention, applied to detection of an abnormality in an output means, which is executed within the ECU.

FIGS. 3 through 5 show embodiments of the method for detecting abnormalities in the functioning of input means and an output means, according to the invention, which can be executed within the CPU 501 in FIG. 2.

Referring first to FIG. 3, there is shown a first embodiment of the invention, which is applied to detection of an abnormality in the functioning of an input means. Input means to which this embodiment can be applied include a sensor such as the intake pipe negative pressure (PB) sensor 8 and the engine water temperature (TW) sensor 10, or a combination of such sensor and a circuitry composed of a voltage level shifter, a filter circuit, an A/D converter, etc. for processing an output signal from the sensor. The embodiment of FIG. 3 is adapted to detect an abnormality in the value VAD of a parameter sensor in the form of a digital signal from the A/D converter 505 in FIG. 2 which is converted from an output signal from the PB sensor 8 or an output signal from the TW sensor 10.

At the step 1 in FIG. 3, it is determined whether or not the engine is operating in an operating region other than predetermined operating regions where detection of an abnormality in the signal value VAD is prohibited, that is, it is determined whether or not a condition in which detection of such abnormality is to be effected now stands. The above predetermined detection-prohibiting operating regions include the following regions, for instance:

(1) an engine starting region where the starter of the engine is operating and the rotational speed Ne of the engine is lower than a predetermined value (e.g. 400 rpm) which is lower than the idling speed of the engine;

(2) an operating region where the rotational speed Ne of the engine is lower than 20 rpm, i.e. where the engine is about to stop; and (3) a high rotational speed region where the rotational speed Ne of the engine is higher than a predetermined value (e.g. 4000 rpm) which is higher than the idling speed of the engine.

If the answer to the question of the step 1 is affirmative, that is, if an abnormality detection-effecting condition now stands, it is then determined at the steps 2 and 3 whether or not the parameter signal value VAD assumes a value falling within a voltage range which the value VAD should fall during normal operation of the input means. That is, at the step 2, whether or not the parameter signal value VAD is higher than an upper limit VH (e.g. 4.9 volts) of the normally operating voltage range is determined, while at the step 3, whether or not the value VAD is lower than a lower limit of the same voltage range is determined.

If the answer to either the step 2 or the step 3 is affirmative, the program proceeds to the step 4 where it is determined whether or not a first abnormality-detecting program timer provided within the CPU 501 is operating, that is, counting a predetermined period of time tFS1. If the program timer is not operating, the same timer is started at the step 5. Then, at the step 6, it is determined whether or not the predetermined period of time tFS1, e.g. 2 seconds, has elapsed from the time the program timer was last started. If the answer to the question of the step 6 is negative, the parameter signal value VAD is set to a value assumed in the immediately preceding loop, that is, a normal value immediately before the value VAD assumes such abnormal value, at the step 7. This set parameter signal value VAD is applied to various calculations executed within the CPU 501, such as calculation of the fuel injection period TOUT by means of the aforegiven equation (1).

If the answer to the question of the step 6 is affirmative, that is, if the parameter signal value VAD has continuously been out of the normally operating voltage range for the predetermined period of time tFS1, e.g. 2 seconds, it is diagnosed that the parameter signal value VAD is abnormal, that is, the functioning of the input means concerned is abnormal, executing a fail-safe action at the step 10.

The fail-safe action may include various kinds of actions. For instance, a warning device such as an alarm lamp is actuated, a corresponding failure code is memorized into a storage means in the ECU, or the parameter signal value VAD is set to a predetermined value falling within the normally operating voltage range, previously stored within the ECU, for use in calculation of the fuel injection period TOUT, etc. Once the input means has been diagnosed as abnormal, the above fail-safe action may continuously be executed until a failure concerned is remedied at a service station, etc. even if the ignition switch is opened on the way.

If neither of the steps 2 and 3 gives an affirmative answer, that is, if the parameter signal value VAD is within the normally operating voltage range, it is diagnosed that the input means concerned is free of any abnormality, and then the first program timer is reset to zero, at the step 8, thus terminating the execution of the present loop of the program.

If the answer to the question of the step 1 is negative, that is, if no abnormality detection-effecting condition stands, the first program timer is reset to zero at the step 9, also terminating the execution of the present loop of the program.

As stated above, by providing the step 1 of determining fulfillment of an abnormality detection-effecting condition, it is possible to prevent the program timer from operating even when the engine is operating in one of the aforementioned predetermined abnormality detection-prohibiting regions. By resetting the program timer to zero according to step execution of the fail-safe action is avoided even if the parameter signal value VAD is determined to be abnormal due to noise or the like during execution of a loop of the program immediately preceding a program loop in which an abnormality detection-prohibiting condition is determined to be fulfilled. That is, in the above-mentioned events, execution of the fail-safe action due to non-resetting of the program timer as in the aforementioned prior art methods can be avoided according to the method of the invention.

Although in the present embodiment the parameter signal value VAD is set to a value obtained in the last loop in the event that it is out of the normally operating voltage range, it may be set to a predetermined value falling within the normally operating voltage range, or the abnormal value VAD may continue to be used insofar as it has no unfavorable results upon the control operation of the system.

FIG. 4 shows a second embodiment of the method of the invention, in which two program timers for counting predetermined periods of time are employed for detection of an abnormality in the functioning of an input means such as the $O_2$ sensor 15 in FIG. 1. It is determined at the step 1 whether or not the engine is operating in an operating region other than the predetermined abnormality detection-prohibiting regions, that is, whether or not an abnormality detection-effecting condition stands. If the answer is yes, the step 3 et seq. are executed to detect whether or not the output signal value $VO_2$ from the $O_2$ sensor 15 is abnormal. At the step 3, whether or not the $O_2$ sensor 15 in an activated state. The step 3 is provided for the reason that detection of an abnormality in the functioning of the $O_2$ sensor should not be made before the activation of the $O_2$ sensor is completed. Various manner of determining the activation of the $O_2$ sensor are known. For example, according to Japanese Provisional Patent Publication (Kokai) No. 52-43030, it is determined whether or not the output voltage from the $O_2$ sensor through which an electric current flows has dropped below a predetermined reference voltage while the mixture supplied to the engine is leaner than a theoretical mixture air-fuel ratio, and if the sensor output voltage has dropped, it is diagnosed that the $O_2$ sensor is an activated state. More specifically, according to this manner, the activation of the $O_2$ sensor is determined to have been completed when a predetermined period of time (e.g. 60 seconds) has elapsed from the time the output voltage $VO_2$ from the $O_2$ sensor drops below a predetermined activation starting voltage Vx (e.g. 0.6 volt) while the same output voltage remains below the voltage Vx.

If the answer to the question of the step 3 is yes, that is, if the activation of the $O_2$ sensor 15 is determined to have been completed, a second abnormality detecting program timer is reset to zero at the step 4. On the other hand, if the activation is determined not to have been completed at the step 3, the program proceeds to the step 6 to determine whether or not the engine water temperature TW is higher than a predetermined low value TWO. This step 6 is provided for the following reason: According to the fuel supply control system shown in FIG. 1, when the engine is in a cold state wherein the engine water temperature TW is lower than the predetermined value TWO, the value of a water temperature-dependent fuel increasing coefficient KTW which forms part of the aforementioned correction coefficients K1, K2 is set to a value more than 1 so as to supply a rich mixture to the engine to thereby ensure satisfactory driveability of the engine. However, this enriching of the mixture can cause an increase in the output voltage $VO_2$ from the $O_2$ sensor above the predetermined reference voltage Vx, which makes it impossible to effect the abnormality detection of the $O_2$ sensor. Therefore, if it is determined at the step 6 that the engine water temperature TW is lower than or equal to the predetermined value TWO, the program proceeds to the step 2 to reset both the second program timer and a third program timer to zero, thereby terminating the execution of the present loop of the program.

If the engine water temperature TW is found to exceed the predetermined value TWO, it is determined at the step 7 whether or not the second program timer is then operating. If the timer is not operating, it is started at the step 8. On the other hand, if the timer is found to be operating, it is determined at the step 9 whether or not a predetermined period of time tFS2, e.g. 10 minutes, has elapsed from the time the timer was last started. If the answer is no, the excution of the present loop is terminated, while if the answer is yes, that is, if the $O_2$ sensor remains in a deactivated state over the predetermined period of time tFS2, it is diagnosed that there is an abnormality in the $O_2$ sensor, executing a fail-safe action at the step 10.

On the other hand, at the step 5, it is determined whether or not a condition is fulfilled for open loop control of the fuel supply quantity to the engine. More specifically, it is determined whether or not the engine is in an accelerating (wide-open-throttle) region wherein the throttle valve 3 in FIG. 1 is in a fully opened position, requiring enriching of the mixture being supplied to the engine, or whether or not the engine is operating in a mixture-leaning operating region wherein the mixture is required to be leaned. When the engine is operating in one of such open loop control operating regions, the air-fuel ratio of the mixture being supplied to the engine is controlled to a richer value or a leaner value than a theoretical mixture ratio, so that the output voltage $VO_2$ from the $O_2$ sensor 15 is held at a higher value or a lower value than a predetermined reference voltage Vref which is substantially equal to an output voltage generated from the $O_2$ sensor when the mixture supplied to the engine has a predetermined mixture ratio in the vicinity of the theoretical mixture ratio, making it impossible to detect an abnormality in the functioning of the $O_2$ sensor 15 at the step 12. Therefore, if the fulfillment of one of the open loop control conditions is determined at the step 5, the third program timer is reset to zero at the step 11, thereby terminating the execution of the present loop. If the answer to the step 5 is negative, that is, if the engine is operating in a feedback control operating region wherein the fuel supply quantity to the engine is controlled in response to the output signal value $VO_2$ from the $O_2$ sensor 15 in closed loop mode, the program proceeds to the step 12. At the step 12, it is determined whether or not there has occurred an inversion in the sign of the differential value $VO_2$ COMP between the output signal value $VO_2$ from the $O_2$ sensor 15 and the predetermined reference value Vref ($=Vref-VO_2$) with respect to the sign of same in the last loop. If there has occurred such inversion, it is diagnosed that the $O_2$ sensor is normally operating, and the third program timer is reset to zero, terminating the execution of the present loop.

If no inversion is determined at the step 12, it is determined at the step 13 whether or not the third program timer is then operating, and if the timer is not operating, it is started at the step 14, whereas if the timer is operating, it is determined at the step 15 whether or not a predetermined period of time tFS3, e.g. 1 minute, has elapsed from the time the timer was last started. If the answer is negative, the execution of the present loop is terminated, whereas if the answer is affirmative, that is, if no inverison has occurred in the sign of the differential value $VO_2$ COMP for the predetermined period of time tFS3 at all even while the engine is operating in the feedback control operating region, it is diagnosed that the functioning of the $O_2$ sensor is abnormal, thereby executing the fail-safe action at the step 16.

If the answer to the question of the step 1 is negative, that is, if an abnormality detection-prohibiting condition stands, the program proceeds to the step 2 wherein the second and third program timers are both reset to zero, thereby terminating the execution of the present loop of the program. This resetting of the second and third program timers upon fulfillment of an abnormality detection-prohibiting condition can avoid the inconvenience that either the second program timer or the third program timer which has been actuated due to noise or a like factor in a previous loop of the program continues to operate over its predetermined counting period of time to cause execution of the fail-safe action.

FIG. 5 shows a third embodiment of the method according to the invention, which is applied to detection of an abnormality in the functioning of the exhaust gas recirculation control system in FIG. 1 including the exhaust gas recirculating valve 19, the EGR control valves 21, 22, etc. The step 1 in FIG. 5 executes the same determination as in the steps 1 in FIGS. 3 and 4 as to whether or not the engine is operating in an operating region other than the aforementioned predetermined abnormality detection-prohibiting regions, wherein an abnormality detection-effecting condition stands. If the answer to the step 1 is negative, a fourth abnormality-detecting program timer is reset to zero to terminate the execution of the present loop of the program. If the answer to the step 1 is affirmative, the program proceeds to the step 3 wherein it is determined whether or not an absolute value $|LCMD-LACT|$ of the differenece between a desired valve opening command value LCMD for the exhaust gas recirculating valve 19 which has been calculated by the aforementioned CPU 501 and the actual valve opening value LACT sensed by the valve lift sensor 24 is larger than a predetermined value $\alpha$. If the answer is no, that is, if the absolute differential value $|LCMD-LACT|$ is smaller than or equal to the predetermined value $\alpha$, the fourth program timer is reset to zero at the step 4, thereby terminating the execution of the present loop.

If the answer to the step 3 is affirmative, that is, if the absolute differential value $|LCMD-LACT|$ is larger than the predetermined value $\alpha$, the program proceeds to the step 5 to determine whether or not the fourth program timer is then operating. If the same timer is found to be at rest, it is started at the step 6, whereas if the timer is found to be operating, it is determined at the step 7 whether or not a predetermined period of time tFS4, e.g. 3 seconds, has elapsed from the time the fourth program timer was last started. If the answer to the step 7 is no, the execution of the present loop of the program is terminated, whereas if the answer is affirmative, that is, the relationship $|LCMD-LACT|>\alpha$ has continuously stood over the predetermined period of time tFS4, it is diagnosed that there is an abnormality in the functioning of the exhaust gas recirculation control system, followed by execution of a fail-safe action at the step 8. In other words, if the actual valve opening value LACT of the exhaust gas recirculating valve 19 does not become equal to or closer to the desired valve opening value LCMD even after the lapse of the predetermined period of time tFS4, it is judged that the functioning of the exhaust gas recirculation control system is abnormal.

This fail-safe action executed in the event of a failure in an output means of an electronic control system can be carried out in various forms which include, for instance, actuating a warning device such as an alarm lamp, memorizing a corresponding failure code into a storage means in the ECU, and setting the value of an output signal from the ECU for controlling the operation of such output means to a predetermined value at which the control system can remain in a safe condition. The last-mentioned fail-safe action, if applied to the exhaust gas recirculation control system, may comprise setting both of the values of the driving signals for the EGR control valves 21, 22 to zero to bring the exhaust gas recirculating valve to a fully closed position.

Although in the embodiments in FIGS. 3 through 5 the operation of an associated program timer is interrupted by resetting the timer to zero when a parameter signal value from an input means or an operating amount signal indicative of the amount of operation of an output means shows a value satisfying a predetermined condition of normal operation of the input means or the output means or when an abnormal detection-prohibiting condition stands, the manner of interrupting the operation of the program timer is not limited to such resetting of the timer. Alternatively, the operation of the program timer may be interrupted so as to hold its counted value of elapsed time at an immediately preceding value, and when the number of times of interruptions of the timer operation reaches a predetermined value, the program timer is reset to zero. According to this alternative manner, early detection of an abnormality is feasible, particularly in the event that the above signal value can happen to instantly fall within its normally operating range while there exists an abnormality.

What is claimed is:

1. A method for detecting an abnormality in the functioning of an electronic control system of the type including at least one input means, and at least one output means, wherein said input means is operable to detect the value of a parameter determining the operation of said output means and generate a first performance signal indicative of the detected parameter value, on the basis of which the operation of said output means is controlled, a second performance signal being indicative of the operation of said output means, the method comprising the steps of:
   (1) determining which of a first predetermined condition in which determination of said abnormality is to be effected and a second predetermined condition in which determination of said abnormality is not to be effected is satisfied;
   (2) when it is determined that said first predetermined condition is satisfied, determining whether or not at least one of said first and second performance signals has a value satisfying a predetermined condition of normal operation of a corresponding one of said input means and said output means;
   (3) when it is determined that said at least one of said first and second performance signals does not have a value satisfying said predetermined condition of normal operation, starting counting of the time elapsed from said determination of dissatisfaction of said predetermined condition of normal operation;
   (4) interrupting said counting, when it is determined that said at least one of said first and second performance signals has a value satisfying said predetermined condition of normal operation before the counted value of the elapsed time reaches a predetermined value;
   (5) determining that an abnormality exists in the functioning of said corresponding one of said input means and said output means, when the counted value of the elapsed time reaches said predetermined value; and
   (6) interrupting said counting, when it is determined that said second predetermined condition is satisfied after said counting of the elapsed time has been started and before the counted value of the elapsed time reaches said predetermined value, to thereby prohibit said abnormality detection.

2. A method as claimed in claim 1, wherein said counting of the elapsed time is started from zero, when said counting is again started after it has been interruped.

3. A method as claimed in claim 1, wherein said predetermined value of the counted elapsed time is set at a value particular to said corresponding one of said input means and said output means.

4. A method for detecting an abnormality in the functioning of an electronic control system for an internal combustion engine, said electronic control system being of the type including at least one input means for detecting the value of a parameter for control of the operation of said engine and generating a first performance signal indicative of the detected value of said parameter, and at least one output means operable in response to the value of said detected parameter value signal from said input means for controlling the operation of said engine, a second performance signal being indicative of the operation of said output means, the method comprising the steps of:
   (1) determining which of a first predetermined condition in which determination of said abnormality is to be effected and a second predetermined condition in which determination of said abnormality is not to be effected is satisfied;
   (2) when it is determined that said first predetermined condition is satisfied, determining whether or not at least one of said first and second performance signals has a value satisfying a predetermined condition of normal operation of a corresponding one of said input means and said output means;
   (3) when it is determined that said at least one of said first and second performance signals does not a value satisfying said predetermined condition of normal operation, starting counting of the time elapsed from said determination of dissatisfaction of said predetermined condition of normal operation;
   (4) interrupting said counting, when it is determined that said at least one of said first and second performance signals has a value satisfying said predetermined condition of normal operation before the counted value of the elapsed time reaches a predetermined value;
   (5) determining that an abnormality exists in the functioning of said corresponding one of said input means and said output means, when the counted value of the elapsed time reaches said predetermined value; and (6) interrupting said counting, when it is determined that said second predetermined condition is satisfied after said counting of the elapsed time has been started and before the counted value of the elapsed time reaches said predetermined value.

5. A method as claimed in claim 4, wherein said counting of the elapsed time is started from zero, when said counting is again started after it has been interrupted.

6. A method as claimed in claim 4, wherein said predetermined value of the counted elapsed time is set at a value particular to said corresponding one of said input means and said output means.

7. A method as claimed in claim 4, wherein fulfillment of said second predetermined condition in which determination of said abnormality is not to be effected is determined depending upon whether or not said engine is operating in one of a number of predetermined operating regions which include:

(a) an engine starting region where a starter provided in said engine is operating and the rotational speed of said engine is lower than a first predetermined value lower than an idling speed of said engine;

(b) a high engine rotational speed region where the rotational speed of said engine is higher than a second predetermined value higher than said idling speed; and (c) a low engine rotational speed region where the rotational speed of said engine is lower than a third predetermined value lower than said idling speed.

* * * * *